Oct. 14, 1958     A. D. NORGARD     2,855,682

OIL DIP STICK GAUGE WIPER

Filed Oct. 8, 1956

Witness
Edward P. Seeley

Inventor
Andrew Dean Norgard
by M. Talbert Dick
Attorney

United States Patent Office 2,855,682
Patented Oct. 14, 1958

2,855,682

OIL DIP STICK GAUGE WIPER

Andrew Dean Norgard, Des Moines, Iowa

Application October 8, 1956, Serial No. 614,655

4 Claims. (Cl. 33—126.7)

This invention relates to a wiper means for the oil dip stick gauge of an internal combustion engine and more particularly to one that is rigidly fixed to the dip stick tube opening portion.

It is highly necessary to periodically check the oil level in engines and in the case of automobiles, trucks and like, it is usually done by the gasoline station attendant each time gasoline is placed in the vehicle. The usual procedure is to remove the dip stick, wipe it off with a rag or like, replace the dip stick, then withdraw the dip stick and observe the oil level on the stick gauge. Obviously, this procedure is dirty, messy, and slow.

Therefore, one of the principal objects of my invention is to provide a simple gauge wiper that cleans the dip stick during its first removal, thereby eliminating the use of a rag or like.

A further object of this invention is to provide a dip stick wiper that may be easily and quickly installed on the dip stick oil tube pipe.

A still further object of this invention is to provide a dip stick wiper that is easily operated.

Still further objects of my invention are to provide an oil dip stick gauge wiper that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Figure 1:
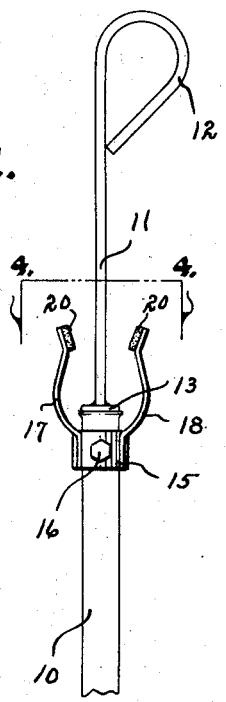
Fig. 1 is a side view of my device installed and ready for use.

In these drawings I have used the numeral 10 to designate the dip stick tube of an internal combustion engine (not shown). The numeral 11 designates an ordinary oil dip stick gauge detachably extending into the oil tube 10. The numeral 12 designates a handle portion on the upper end of the stick 11. The numeral 13 designates a stop cap around the upper end portion of the stick 11. This member 13 limits the movement of stick down into the tube 11, and also closes the open top of the tube 10, when the dip stick is in the tube 10. It is to such that I use and install my device and which I will now describe in detail.

Figure 3:
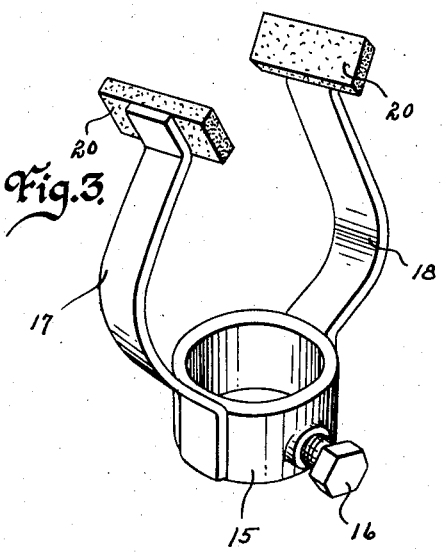
Fig. 3 is an enlarged perspective view of my device prior to installation.

The numeral 15 designates the collar portion of my device and which has an inside diameter greater than that of the outside diameter of the tube 10. The numeral 16 designates a set screw threaded through the collar 15 and when the device is installed this collar is placed around the upper end portion of the tube 10 and secured thereto by any suitable means. The set screw 16 is a good fastening means and when tightened to engage the tube 10, the collar 15 will be rigidly secured to the tube 10, as shown in Fig. 1. The numerals 17 and 18 designate two metallic or like spring or flexible resilient arms secured to the collar 15 and points diametrically opposite each other, as shown in Fig. 3. These two arms 17 and 18 first extend upwardly and outwardly away from each other, then upwardly and slightly inwardly toward each other in curved paths, and thence upwardly and outwardly, as shown in Fig. 3. On the free inner upper end portion of each arm is an oil wiping element 20, such as a block of felt, rubber or like. Normally, the spring arms are further apart than the diameter of the stop cap 13, as shown in Fig. 1, thus permitting the removal or replacement of the dip stick without interference from the spring arms engaging the stop cap 13.

Figure 2:
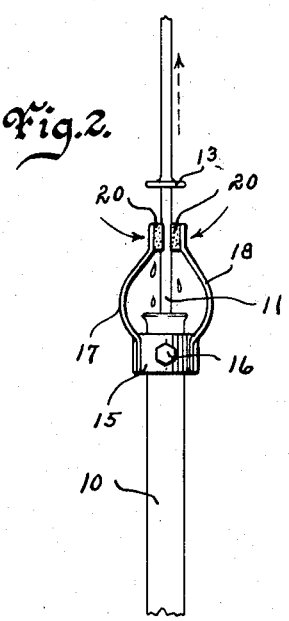
Fig. 2 is a side view of my installed wiper depressed into wiping condition.
Figure 4:
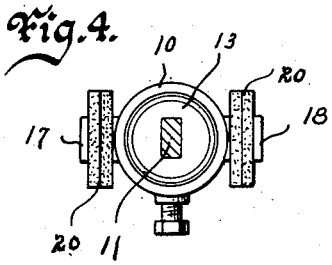
Fig. 4 is an enlarged top plan view of my oil dip stick gauge wiper taken from line 4—4 of Fig. 1.

With my device installed its operation is as follows:

The dip stick is elevated until its stop cap 13 has cleared the top of the spring jaw arms 17 and 18, at which time the arms 17 and 18 are compressed toward each other by the thumb and finger of the other hand of the one raising the dip stick. This action brings the wiping elements 20 into direct wiping contact with the dip stick gauge, as shown in Fig. 2. At this moment the dip stick gauge is pulled completely out of the holding oil tube 10 and from between the compressed arms 17 and 18. Obviously, the arm units 17 and 18 will have yieldingly contacted the dip stick as it was slidably removed from between them and thereby swept, scraped, or wiped adhering oil from the gauge portion of the dip stick. By this arrangement the first initial removal of the dip stick provides a cleanly wiped one. No rag is necessary to wipe the dip stick after its removal. The operation is rapid, clean and effective as the dip stick is cleaned of oil at moment of its removal and there are no objectionable drippings of oil onto the clothing or exterior finish of the vehicle. Upon the removal of the dip stick, the spring arms 17 and 18 are released to return to an open condition, as shown in Fig. 1. With the dip stick clean, it is replaced into the tube 10, and then removed to observe the oil level line on the gauge of the dip stick.

From the foregoing it will be seen that I have provided a dip stick wiper that automatically assumes a non-operating position when not needed and in no way interferes with the removal or replacement of the dip stick. However, when needed, it is merely necessary to compress the arms 17 and 18 against this spring action and cause the dip stick to be wiped of oil at the time of its withdrawal.

Some changes may be made in the construction and arrangement of my oil dip stick gauge wiper without departing from the real spirit and purpose of my invention, and it is my intention to cover by my claims, any modified forms of structure or use of mechanical equivalents which may be reasonably included within their scope.

I claim:

1. In combination, an oil pipe extending into the oil system of an internal combustion engine, a dip stick gauge detachably slidably extending downwardly into said pipe, a stop cap on said gauge, a collar embracing said pipe, a set screw extending through said collar and in engagement with said pipe, two spring arms extending upwardly from said collar to a plane above said oil pipe and at each side of said dip stick gauge respectively, and a wiping element on the inner free end portion of each of said spring arms; said arms, when in normal positions, having a space between them greater than that of the measurement of the diameter of said stop cap.

2. In combination, a dip stick gauge holder, a dip stick gauge, a stop cap on said gauge, a base, a means for securing said base to said dip stick gauge holder, and two spring wiper arms extending from said base at points diametrically opposite from each other and at each side of said dip stick gauge, respectively; said arms, when in normal positions, having a space between them greater than that of the measurement of the diameter of said stop cap.

3. In combination, a dip stick gauge holder, a dip stick gauge, a stop cap on said gauge, a base, a means for securing said base to said dip stick gauge holder, and two spring wiper arms extending from said base at points diametrically opposite from each other and at each side of said dip stick gauge, respectively; a wiping pad block on each of said arms; said arms, when in normal positions, having a space between them greater than that of the measurement of the diameter of said stop cap.

4. In combination, an oil pipe extending into the oil system of an internal combustion engine, a dip stick gauge detachably slidably extending downwardly into said pipe, a stop cap on said gauge, a collar embracing said pipe, two spring arms extending upwardly from said collar to a plane above said oil pipe and at each side of said dip stick gauge respectively, and a wiping element on the inner free end portion of each of said spring arms; said arms, when in normal positions, having a space between them greater than that of the measurement of the diameter of said stop cap.

References Cited in the file of this patent

UNITED STATES PATENTS

| 1,871,208 | Bouchard | Aug. 9, 1932 |
| 1,947,833 | Dolbier | Feb. 20, 1934 |

FOREIGN PATENTS

| 1,041,308 | France | May 27, 1953 |